United States Patent [19]

Hooker et al.

[11] Patent Number: 4,695,951
[45] Date of Patent: Sep. 22, 1987

[54] COMPUTER HIERARCHY CONTROL

[75] Inventors: Lane K. Hooker, Phoenix; Thomas H. Howell, Scottsdale; Charles W. Ferrell, Phoenix, all of Ariz.

[73] Assignee: Honeywell Bull Inc., Phoenix, Ariz.

[21] Appl. No.: 511,616

[22] Filed: Jul. 7, 1983

[51] Int. Cl.⁴ ............................................. G06F 15/16
[52] U.S. Cl. .................................................... 364/200
[58] Field of Search ... 364/200 MS File, 900 MS File

[56] References Cited

U.S. PATENT DOCUMENTS

| 3,422,401 | 1/1969 | Lucking | 364/200 |
| 3,510,844 | 5/1970 | Aranyi et al. | 364/200 |
| 3,735,360 | 5/1973 | Andersen et al. | 364/200 |
| 3,967,247 | 6/1976 | Andersen et al. | 364/200 |
| 4,394,727 | 7/1983 | Hoffman et al. | 364/200 |
| 4,394,731 | 7/1983 | Flusche et al. | 364/200 |
| 4,471,429 | 9/1984 | Porter et al. | 364/200 |
| 4,527,238 | 7/1985 | Ryan et al. | 364/200 |
| 4,551,799 | 11/1985 | Ryan et al. | 364/200 |

Primary Examiner—David Y. Eng
Attorney, Agent, or Firm—A. A. Sapelli; J. S. Solakian

[57] ABSTRACT

A multiple processor computer system features a store-into cache arrangement wherein each processor unit of the system has its own unique cache memory unit. Data operated upon by any one of the processor units is stored in the cache memory associated with that processor unit. When a thus modified block of data is required by another one of the processor units, the requested data is transferred directly to the requesting processor unit without having to first transfer the data to a shared main memory. Provision is also made for transferring data, under prescribed conditions from a cache to the main memory, but not as a precondition for transfer to a requesting processor.

3 Claims, 6 Drawing Figures

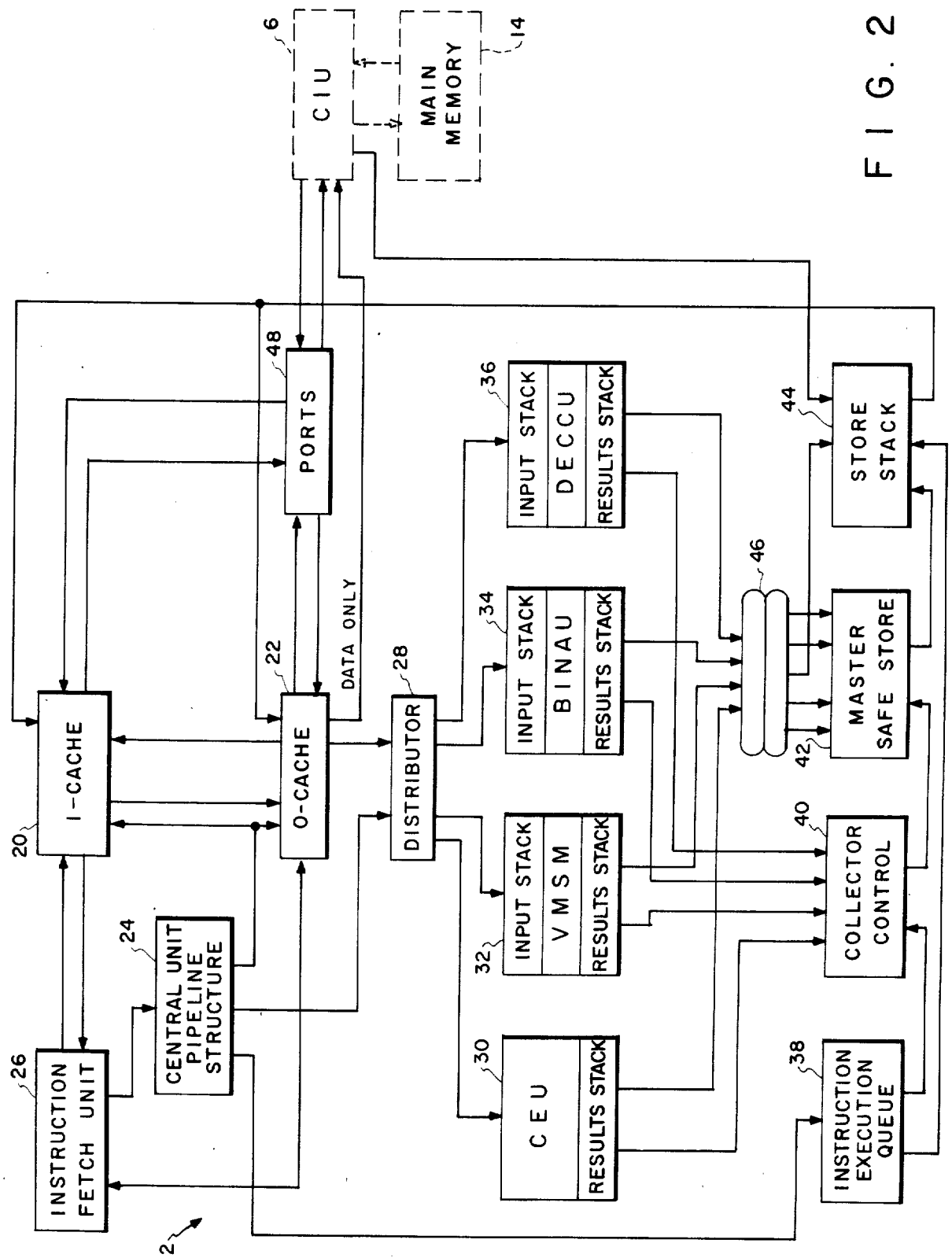

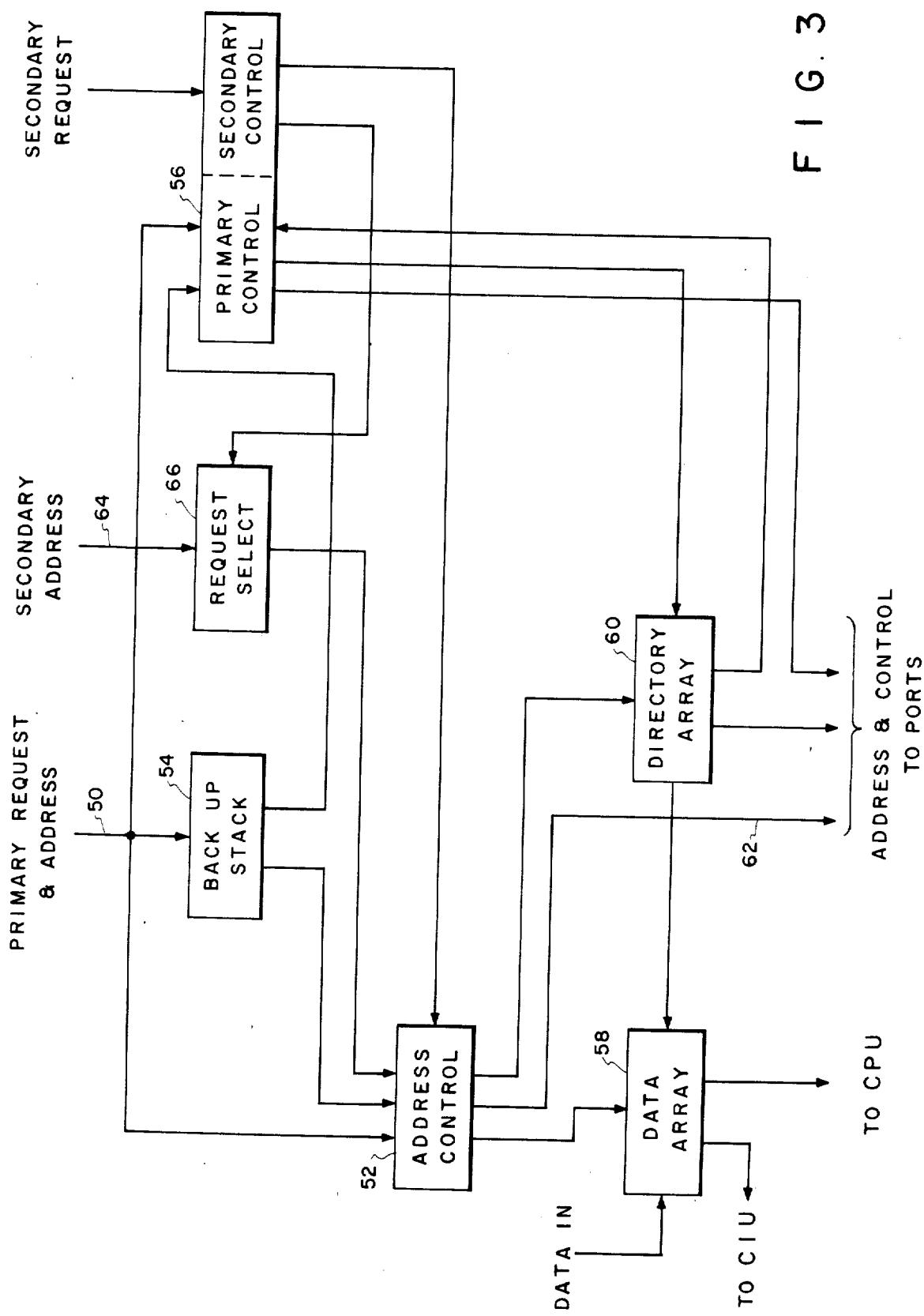

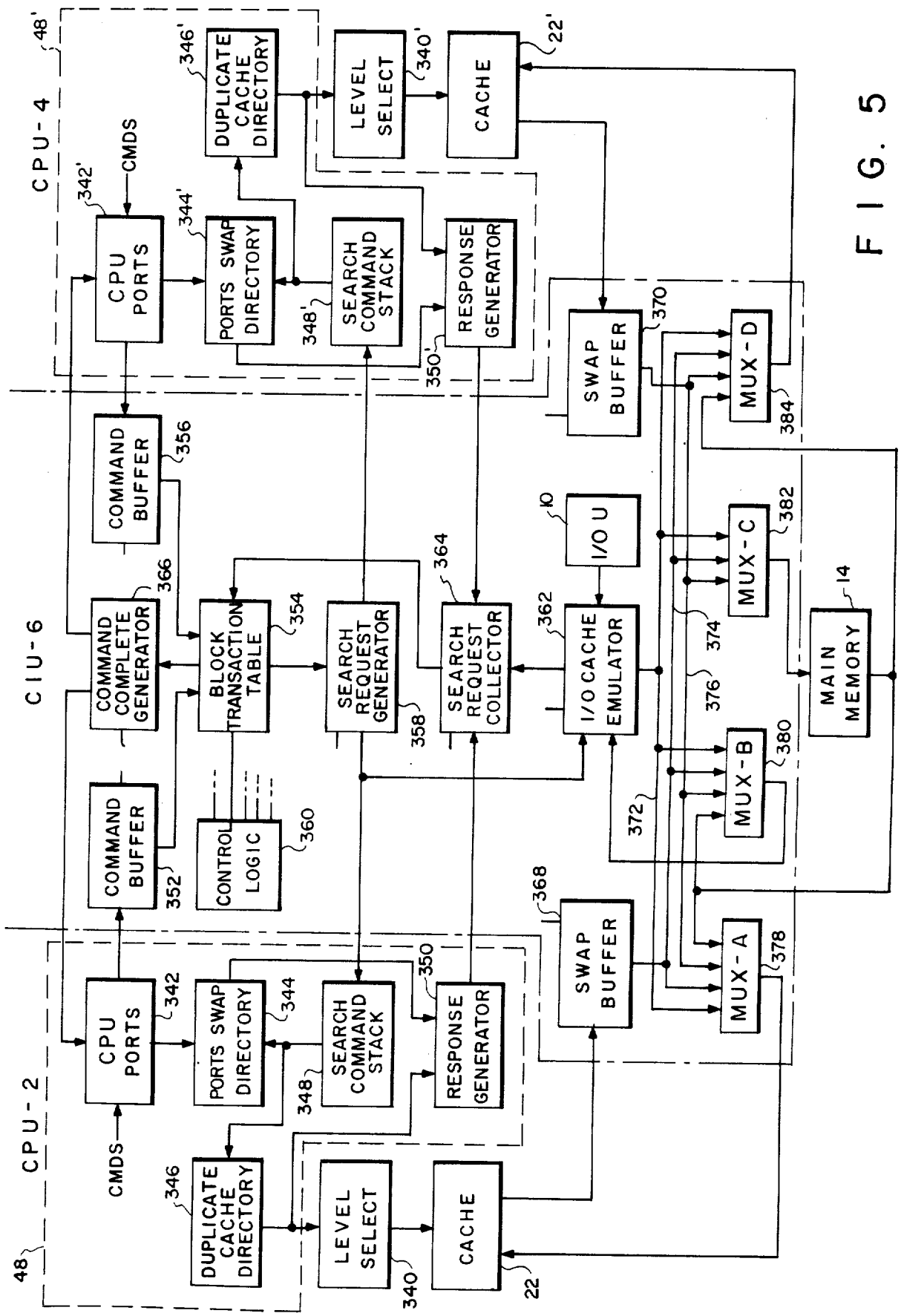
F I G. 5

COMPUTER HIERARCHY CONTROL

CROSS REFERENCES

Subject matter described but not claimed herein is shown and claimed in at least one of the following co-pending applications:

Ser. No. 470,127, filed 2/28/83 for Dual Cache Memory —Ryan & Trubisky.

Ser. No. 470,353, filed 2/28/83 for Cache With Independently Addressable Data and Directory Array—Ryan & Guenthner which issued as U.S. Pat. No. 4,527,238 on July 2, 1985.

Ser. No. 470,126, filed 2/28/83 for Peripheral Secondary Access for Cache —Ryan & Guenthner.

Ser. No. 470,125, filed 2/28/83 for Verification of Prefetched Instruction for Cache—Ryan & Guenthner which issued as U.S. Pat. No. 4,551,799 on Nov. 5, 1985.

BACKGROUND OF THE INVENTION

The present invention relates to computer systems. More particularly, it relates to the control of data flow between processors of a multiprocessor system.

In the art of digital data processing systems, such systems may include a plurality of individual processing units, each having its own unique cache memory. At the same time, the several processing units may share a common main memory. In the interest of maximizing the throughput of the processing unit, it is known to operate the cache memories on a store-into basis. In other words, for data that has been extracted from the main memory and operated uponor modified by one of the processing units, the resulting data is stored only in the cache memory associated with that processing unit. Under those conditions, the only location of the latest version of modified data is in the cache associated with that processing unit. The same data block remaining in the main memory will be invalid. If, now, one of the other processors has a need for the same block of data, means must be provided for making the latest form of the data available to the requesting processor.

The problem has been addressed in an earlier patent, U.S. Pat. No. 3,735,360—Anderson, et al. In that patent there is disclosed a system wherein a record is kept in each of the cache memory units indicative that the only valid copy of the required data is located in one of the cache memories. Thus, on demand the required data is transferred from the cache where it is found back to the main memory and then accessed from the main memory to the requesting processing unit. Such a system is, of necessity, slow in that the main-memory, a much slower unit must be accessed twice for each such transfer.

SUMMARY OF THE INVENTION

It is, accordingly, an object of the present invention to provide an improved computer system which avoids the foregoing diffficiences.

It is another object of the present invention to provide an improved computer system as set forth which features an enhanced through-put characteristic.

It is a further object of the present invention to provide a computer system as set forth which features an improved control of data flow.

In accomplishing these and other objects, there has been provided, in accordance with the present invention, a multiple processor computer system which features a store-into cache arrangement wherein each processor unit of the system has its own unique cache memory unit. Data operated upon by any one of the processor units is stored in the cache memory associated with that processor unit. When a thus modified block of data is required by another one of the processor units, the requested data is transferred directly to the requesting processor unit without having to first transfer the data to a shared main memory. Provision is also made for transferring data, under prescribed conditions from a cache to the main memory, but not as a precondition for transfer to a requesting processor.

BRIEF DESCRIPTION OF THE DRAWINGS

A better understanding of the present invention may be had from the following detailed description when read in the light of the accompanying drawings in which:

FIG. 2 is a schematic block diagram of a processing unit of a type embodied in the present invention;

FIG. 3 is a schematic block diagram of a cache memory unit of a type embodied in the present invention;

FIG. 5 is a block diagram of the hierarchy control for a computer system in accordance with the present invention.

DETAILED DESCRIPTION

Figure 1:
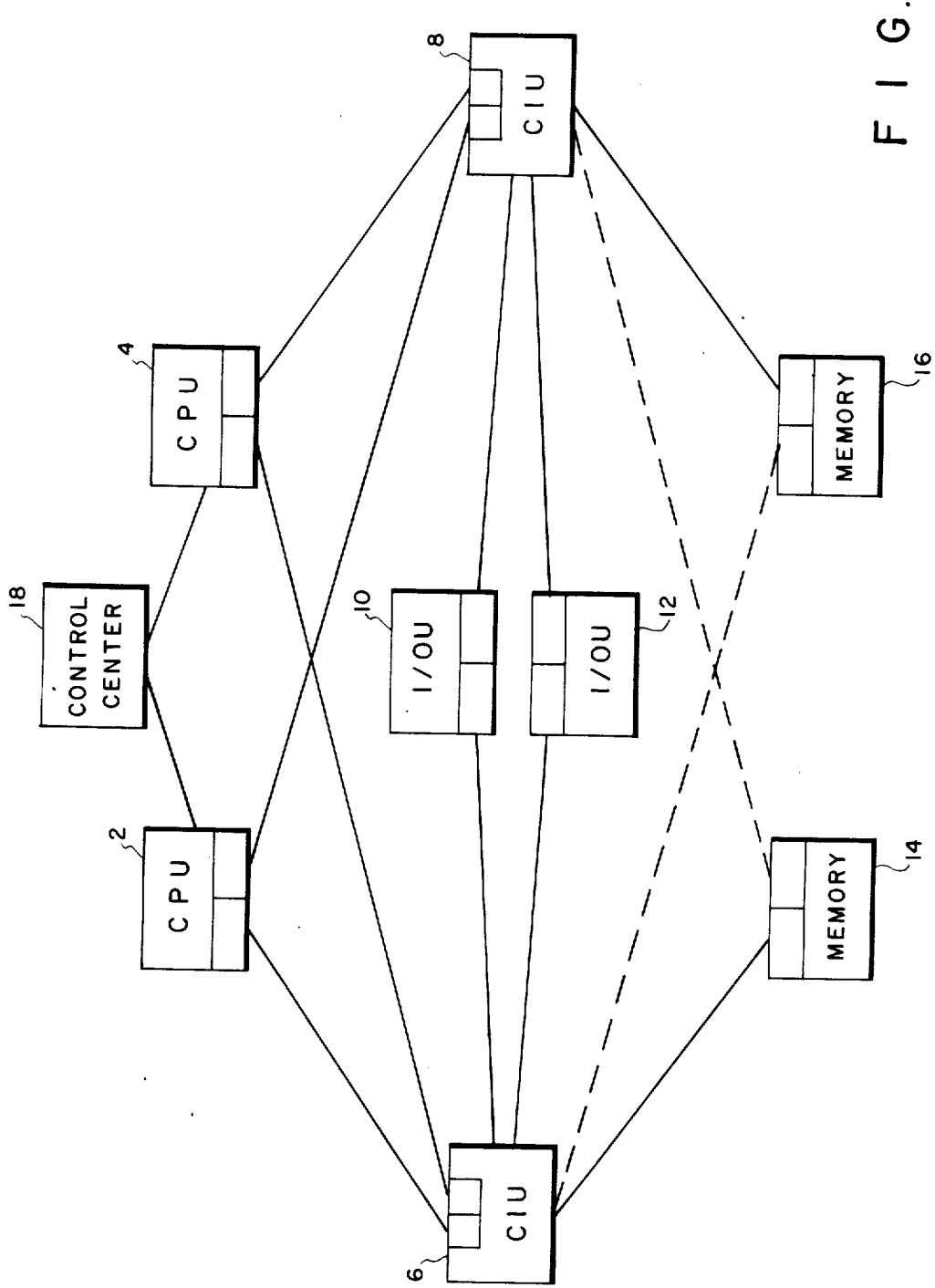
FIG. 1 is a schematic block diagram of a computer system embodying the present invention.

Referring now to the drawings in more detail, there is shown in FIG. 1 a computer system of the type hereinbefore referred to. As set forth in a co-pending application of R. C. Moffett, Ser. No. 415,130, the illustrated computer system features a distributed operational characteristic. As shown, the system includes a first central processor unit (CPU) 2 and a second central processor unit (CPU) 4. There is also provided a first central interface unit (CIU) 6 and a second central interface unit (CIU) 8. The first CPU 2 has means for communicating with both the first CIU 6 and the second CIU 8. Similarly, the second CPU 4 has means for communicating with the first CIU 6 and the second CIU 8. One or more input/output units (I/O U) 10 and 12, respectively, are provided. These units basically provide a multiplexed interconnect between the CIUs 6 and 8 and the input/output peripheral units of the system. A first memory unit 14 is connected to be associated with the first CIU 6. Similarly, a second memory unit 16 is connected to be associated with the second CIU 8. In such a system the central processor units 2 and 4 perform the usual computational manipulation of data.

Data is received from or transmitted to the input/output unit 10. The central interface units 6 and 8 provide, among other things, a traffic management function between the central processor unit, the input/output units and the associated memory units.

The memory units 14 and 16 provide a storage place for original data as well as data which has been manipulated by the CPUs. In the system herein set forth, it will be noticed that each of the central interface units 6 and 8 may be in direct communication with either of the two central processor units 2 and 4. Both of the central interface units are in communication with the input-/output units 10 and 12. Additionally, in the exemplary embodiment of the present invention, each of the two CIUs has the capability of communicating directly with the memory unit associated with the other half of the system. Thus it may be seen that there is an intercommunication capability between the two halves of the illustrated system.

Because of that intercommunication capability, it is necessary that the several components of the system be all synchronized with respect to each other. To this end, there is provided a control center 18. The control center 18 is, in effect, a further CPU whose function is to define the basic control operations for the system, including the synchronization of the operating units.

The structure illustrated in FIG. 1 is set forth for the purpose of illustrating the environment in which the present invention operates.

In FIG. 2, there are shown the major components, or subsystems, of a CPU such as the CPU 2 shown in FIG. 1; the other CPU 4 is identical in structure. As usual, the CPU 2 includes a cache memory. In the exemplary embodiment illustrated in FIG. 2, that cache memory is illustrated as being in two parts or units, one part being an instruction cache 20 hereinafter identified as an I-cache. The other part of the cache memory is illustrated as being an operand cache 22, hereinafter identified as an O-cache. As is more fully set forth in the aforesaid co-pending application of Shelly and Trubisky, a central unit pipeline structure (CUPS) 24 controls the overall operation of the processor 2. An instruction fetch unit 26 supplies or transmits the address of instruction words to the instruction cache 20 and/or to the operand cache 22. In response to the receipt of an instruction address by the instruction cache from the instruction fetch unit 26, an instruction double word is transmitted from the cache 20 or 22 to the instruction fetch unit 26. The instruction fetch unit 26, in turn, stores or accumulates a series of instructions in an instruction stack which is a part of the instruction fetch unit 26.

The central unit pipeline structure (CUPS) 24 obtains the instructions in program order from the instruction stack of the instruction fetch unit 26. The CUPS unit 24, in the illustrative embodiment, features a five-stage pipeline which, as is more fully described in the aforementioned co-pending application, as well as in a co-pending application of Wilhite and Shelly, Ser. No. 434,196, processes the instructions obtained from the instruction fetch unit 26 and effects a decoding of the operation code and the formation of an operand address. As will be described more fully hereinafter, if the required data is found in the cache memory units, such data is extracted and applied through a distributor 28 to the appropriate one of several execution units.

In the exemplary embodiment of the computer system, the several execution units include first, a central execution unit 30 the architecture of which is particularly adapted to performing basic computer operations, such as simple loads, adds, subtracts, etc. The central execution unit (CEU) 30 is further characterized in that it executes operations on an as-received basis. A second execution unit is identified as a virtual memory and security manager unit (VMSM) 32. This unit executes instructions relating to virtual memory, security and special instructions that are peculiar to a secure operating system. A third execution unit is identified as a binary arithmetic unit (BINAU) 34. The architecture of this unit is particularly oriented towards the execution of binary arithmetic instructions such as multiply, divide and floating point instructions. A fourth execution unit is, in the exemplary embodiment, identified as a decimal/character execution unit (DECCU) 36. This unit is particularly adapted to the execution of decimal arithmetic, alpha numeric and bit string instructions. Each of the execution units 32, 34 and 36 is provided with an input stack for the accumulation and sequential issuing of input instructions and data for the respective execution units. Similarly, each of the execution units 30, 32, 34 and 36 is provided with a results stack for the accumulation and sequential issuance of the result of the execution in the respective execution units. An instruction execution queue 38, under control of the central unit pipeline structure 24 stores execution queue words in program order. A collector control unit 40 uses the instruction execution queue words to control the order of reading out of the resultant data in the result stack of each of the execution units 30, 32, 34 and 36. These execution results may, under such control, be stored either in the master safe store unit 42 or the store stack unit 44, through the operation of a selector switch arrangement 46.

All of the foregoing has been premised on the finding of the required data in the cache structure 20 or 22. In the event that the required data is not found in the cache units, the main memory 14 is accessed through the CIU 6 in order to obtain the required data. The CIU 6 is, in turn, accessed by the cache units 20 or 22 through a PORTS unit 48. When so obtained the data is stored in the cache structure. The operation of the CPU then proceeds as hereinbefore set forth. When the selected data has been acted upon by the appropriate one or more of the execution units, the data is restored to the cache structures by the store stack 44.

In FIG. 3 there is illustrated in block diagram form the components or subsystems of each of the two cache memory units illustrated in FIG. 2. Primary request and address information is supplied to the input connection 50. The connection 50, in turn, supplies the information as needed to an address control unit 52, a backup stack unit 54, and a primary control portion of a main control arrangement 56. The primary control portion of the control arrangement 56 effects the necessary timing functions for the operations of the cache memory elements. The address control unit 52 also serves in the capacity of controlling the timing of the signal operations within the cache structure and effects a preliminary distribution of the signals to the appropriate functioning elements. For example, the primary address information is channeled by operation of the address control unit 52 to a data array 58, to a directory array 60 and by means of a connection 62 to the ports unit 48 of the CPU.

The data array 58 is a memory array having, in the exemplary embodiment, a capacity for 8,192 words each. These are arranged into four columns or levels each of a nominal 1K × 80 bits (or two forty bit words). This structure will be more fully described hereinafter. The directory array 60 is similarly formed in four levels each having 256 18-bit words. This structure will also be more fully described hereinafter.

When data is retrieved from the main memory for storage in the cache memory unit, it is retrieved in eight word blocks. Since each level of the data array is two words in width, the eight word block occupies four consecutive rows of the selected level of the data array. Thus, each level of the data array may contain up to 256 eight word blocks. Each level of the directory array has the capacity for 256 eighteen bit words. The 256 words of each level of the directory array are paired with the 256 eight word blocks stored in the corresponding level of the data array 58. The ports unit 48 of the CPU includes, among other elements, a duplicate of the directory 60. To that end, the address control unit 52 also delivers address information by way of the connection 62 to the ports unit 48. Similarly, the directory array 60 also has a communication link with the ports unit 48.

Data read out of the data array 58 may be supplied as indicated in FIG. 2 through a distributor 28 to any one of the execution units of the CPU. Similarly, data read out from the data array 58 may also be supplied directly to the CIU 6.

As previously noted, more than one activity may be transacted in the cache substantially simultaneously. To that end, secondary requests and addresses are applied to the cache memory. The secondary address may be applied by way of an input 64, representative of one of several sources of secondary address information, as will be shown hereinafter. That secondary address is applied to a request select unit 66. The secondary requests are applied through an input 68, representative of one or more one of several sources of such request signals, to the input of a secondary control portion of the main control unit 56. The secondary control portion of the unit 56 applies a control signal circuit to control the operation of the request select unit 66 and a further control signal to the address control unit 52. These signals control the time and selection operation of the respective units. The output of the request select unit applies the secondary address information to a further input of the address control unit 52. These are, in turn, selectively applied to the directory array 60 and/or the data array 58 for the appropriate processing thereby.

Figure 4A:
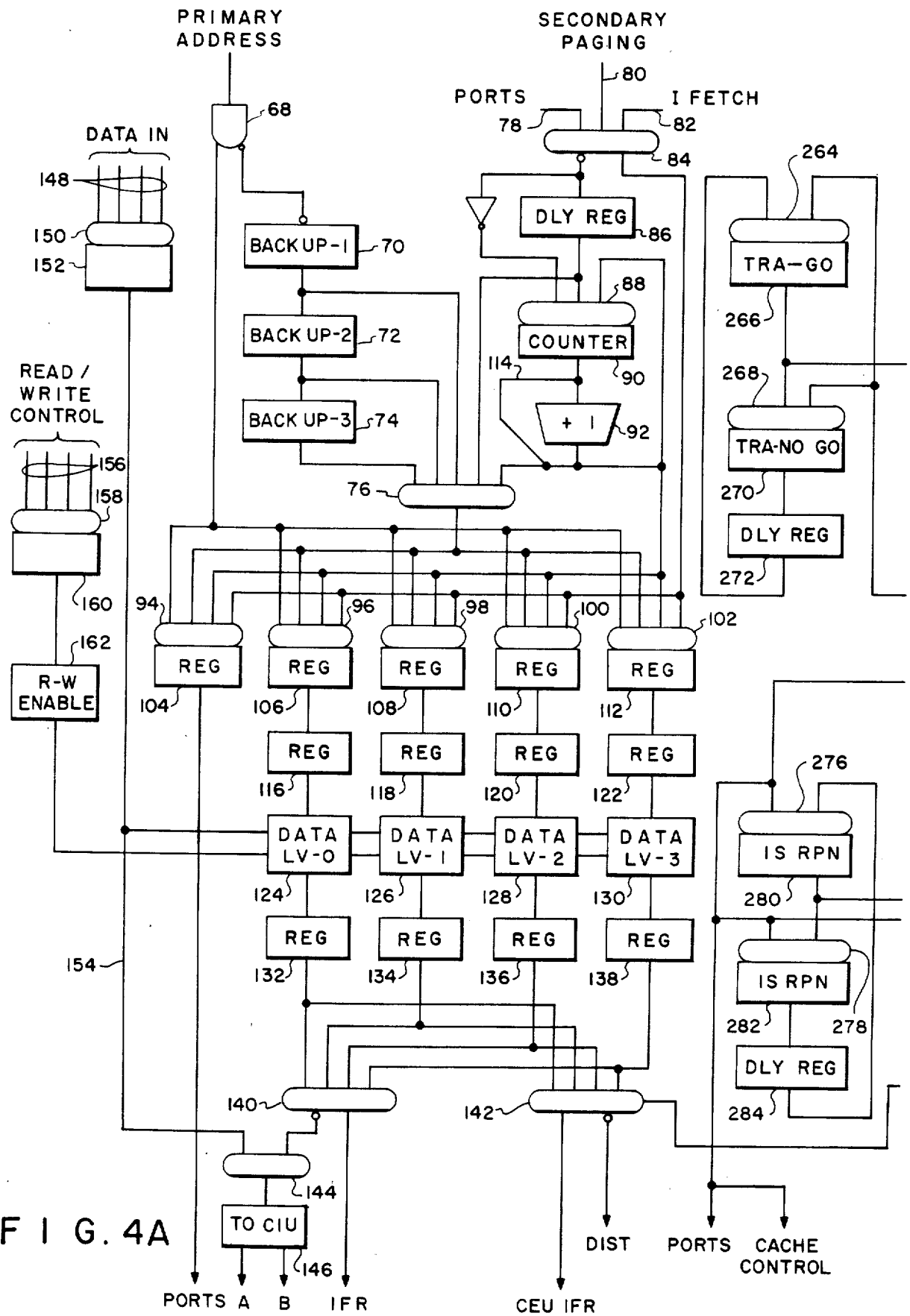
FIGS. 4A and 4B together form a detailed logic diagram of a cache memory unit of the type shown in FIG. 3.
Figure 4B:
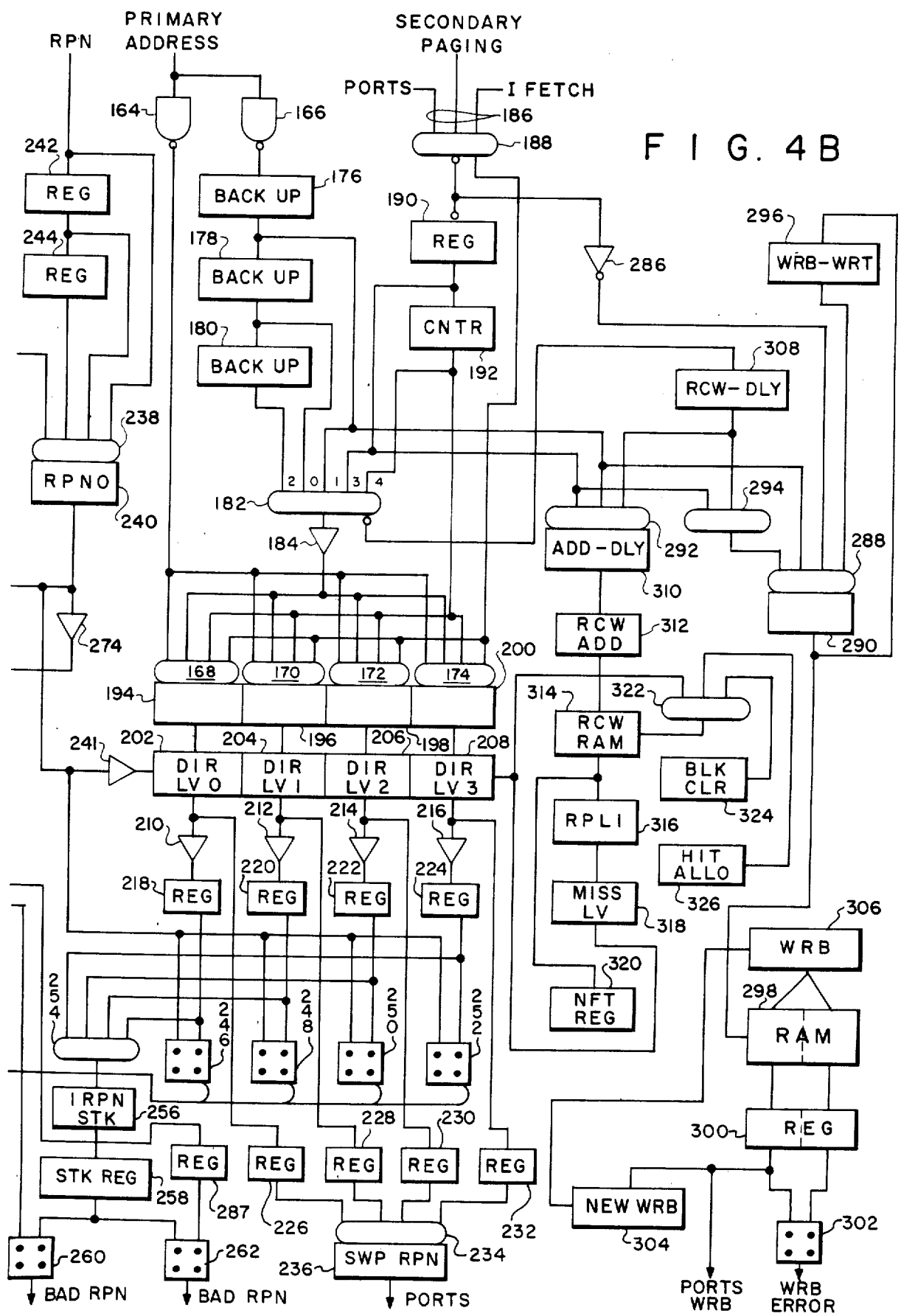

In FIG. 4, there is a detailed logic diagram of the functional elements of each of the cache memory units in accordance with the present invention, the I-cache and the O-cache being structurally identical. Primary address signals are applied to the input of a gating means 68. The gating means 68 is provided with a true and a complementary output. The true output is applied to one input of a signal distribution arrangement which will be discussed more fully hereinafter. The complementary output of the gating means 68 is applied to a backup stack comprising a set of three cascaded registers 70, 72 and 74. The output of each of the three backup register 70, 72 and 74 is applied as input to a selector switch 76.

A plurality of secondary input address signals are applied, respectively, to the three input connections 78, 80 and 82. The input signals represent, respectively, signals from the ports units 48 of the CPU, a paging signal, and an instruction fetch signal. These signals are applied to the input side of a selector switch 84. The selector switch 84 is provided with a true output and a complementary output. The true output is connected directly to the signal distribution network aforementioned. The complementary output is applied to a first counter or register 86 the output of which is connected through a selector switch 88 to the input of a second counter 90. The complementary output of the selector switch 84 is also applied through an inverter directly to the input of the selector 88, thence to the counter 90. The output of the counter 90 is applied first through an incrementing adder 92 the output of which is connected to a further input of the selector 76, directly to a further input of the distribution network, and, via a feedback, to the input of the selector 88. The output of the counter 86 is also applied directly to the input of the selector switch 76.

The signal distribution network hereinbefore mentioned includes, in the exemplary embodiment, five input selectors 94, 96, 98, 100 and 102, respectively. Each of the selectors 94-102 has its respective outputs connected to register means 104, 106, 108, 110 and 112, respectively. Each of the five input selectors 94-102 has four input connections with the individual input connections of each of the selectors connected to the corresponding input connection of the others of the five selectors. Thus, the true output of the gating means 68 is connected to a first input connection of all five of the input selectors 94-102. The output of the selector switch 76 is connected in common to the second input connection of the five input selectors. The output of the adder 92 and the output of the counter 90 by way of the bypass connection 114 are connected in common to the third input connection of each of the input selectors 94-102. The true output of the selector switch 84 is connected directly in common to the fourth input connection of the five selector switches 94-102. The output of the register 104 comprises a block number output for connection to the ports assembly 48 of the CPU. The output of the register 106 is connected to the input of an input register 116. The output of the register 108 is connected to the input of an input register 118. Similarly, the output of the register 110 and the output of the register 112 are connected, respectively, to the input of further input registers 120 and 122.

The input registers 116, 118, 120 and 122 comprise the input registers for the data array memory unit of the cache. The cache memory is established in four levels. In the exemplary embodiment, each level of the data array comprises RAM means of 1K×80 dimension. These levels are indicated as being four RAM memories 124, 126, 128 and 130, respectively. Each of the data array level units is provided with an output register 132, 134, 136, 138, respectively. The output of the register 132 is connected to a first input of each of two selector switch means 140 and 142, respectively. The output of the register 134 is applied to a second input of each of the two switch means 140 and 142. Similarly, the output of the registers 136 and 138 are applied, respectively, to a third and a fourth input of the selector switch means 140 and 142. The switch 140 is provided with a true output and a complementary output. The true output is connected to the instruction fetch register of the instruciton fetch unit 26 illustrated in FIG. 2. The complementary output of the switch 140 is connected to one input of another selector switch 144. The output of the selector 144 is connected to a register 146. The register 146 is also provided with a true and a complementary output. The two outputs of the register 146 are connected, respectively, to the two CIU units 6 and 8 illustrated in FIG. 1.

Data input signals for the data array comprising the RAMS 124, 126, 128 and 130 is derived from one or more of a plurality of input connections 148. These input connections 148 are connected as input to a selector switch 150 the output of which is connected to a register 152. The output of the register 152 is applied as input to the data array RAMS 124, 126, 128 and 130. By way of a bypass lead 154, the output of the register 152 is applied directly to the second input of the selector 144 for transmission to one or the other of the CIU units by way of the register 146.

Control signals for controlling the read/write operation of the data array is applied from any of the several sources within the computer system to a plurality of input connections 156. Those connections are arranged as input to a selector 158 the output of which is connected to a register 160. The output of the register 160 as applied as input to an enable logic network 162. The enable logic network 162 is arranged to respond to the input signals in a manner to establish which level of the data array information is to be read from or written into.

Primary address information is also applied to a pair of gating members 164 and 166, respectively. The output of the gate 164 is applied to one input of a distribution network similar to that shown in connection with the data array. That is, the output of the gate 164 is connected in common to a first input terminal of each of four selectors 168, 170, 172 and 174. The output of the gate 166 is connected through a backup chain of three registers, 176, 178 and 180. The output of the first register 176 is connected, in addition to the input to the second register 178, to an input teminal of a selector switch arrangement 182. The output of the second register 178, in addition to being connected to the input of the third register 180 is also connected to a further input of the selector 182. The output of the third register 180 is also connected to a third input of the selector 182. The selector 182 is provided with a true output and a complementary output. The true output is connected through an amplifier to a common connection to a second input of each of the four selectors, 168, 170, 172 and 174.

As before, secondary address information is provided on one or more of three input connections 186 identified, respectively, as ports, paging, and I-fetch. These input connections are applied to the input of a selector switch arrangement 188. The switch 188 is provided with a true output and a complementary output. The complementary output is connected as input to a first register 190 the output of which is connected to a second register 192. The output of the first register 190 is connected to another input of the selector 182 while the output of the second register 192 is connected to still another input of the selector 182. Additionally, the output of the second register 192 is connected, in common, to a third input of each of the selectors 168, 170, 172 and 174. The true output of the selector 183 is connected directly, in common, to a fourth input of the four selectors, 168, 170, 172, and 174.

The output of the selectors 168, 170, 172 and 174 are connected, respectively, to the input of four registers 194, 196, 198 and 200. The registers 194, 196, 198 and 200 comprise input registers for the directory array of the cache assembly. As in the case of the data array, the directory array is also arranged in four levels represented by the four RAMS 202, 204, 206 and 208. In the exemplary embodiment of the present invention, each of these four RAMS comprises a 256×18 array. The output of each of the levels of the directory array is connected, respectively, through a driver amplifier 210, 212, 214 and 216, to a corresponding holding register 218, 220, 222, and 224. The output of the directory array levels are each connected, respectively, to an output register 226, 228, 230 and 232. The output of each of these registers is connected to separate inputs of a selector switch 234 the output of which is connected to an output register 236. The output of that register 236 is connected to the ports unit 48 of the CPU.

In correlating the activity of the cache with the main memory unit, a real page number is applied to the input connection RPN. That number is applied, first, directly to one input terminal of a selector switch member 238. The output of which is connected to a real page number register 240. The RPN is also applied to the input of a first register 242 the output of which is applied to the input of a second register 244. The output of the first register 242 is also connected to a separate input of the selector switch member 238. The output of the second register 244 is similarly connected to a third input connection of the switch member 238. The output of the RPN register 240 is applied through a first buffer amplifier 241 to a control input of the directory array comprised of the four RAMS 202, 204, 206 and 208. The output of the register 240 is also applied directly to one input of each of four comparators 246, 248, 250 and 252. The comparator 246 has its other input connected to the output of the register 218 to compare the real page number with the page number designation in the register 218. Similarly, the comparator 248 has its other input connected to the register 220, the comparator 250 has its other input connected to the register 222 and the comparator 252 has its other input connected to the register 224. The output of the comparators 246, 248, 250 and 252 are connected to control the selection effected by the selector 142. The output of each of the registers 218, 220, 222 and 224 is also connected, respectively, to four input connections of a selector switch member 254. The output of the selector switch 254 is connected to the input of an instruction real page number stack 256. An output from the stack 256 is applied as input to a stack register 258, the output of the stack register is applied to one input each of a pair of comparators 260 and 262, respectively.

The output of the real page number register 240, in addition to being applied to the directory array and the directory comparators, is also applied to one input of a selector switch 264 the output of which is applied to a register 266 labeled TRA GO. The output of the register 266 is applied first as a fourth input to the selector switch 238. Second, it is applied as one input of a selector switch 268. The output of which is connected to a register 270 labeled TRA NOGO. The second input of the selector switch 268 is connected also the output of the RPNO register 240. The output of the register 270 is applied as input to a delay register 272, the output of which is connected in a loop-back to a second input of the selector switch 264.

The output of RPNO register 240 is also applied, through a buffer amplifier 274, to the input of a selector switch 276 and to an input of a selector 278. The output of the selector 276 is applied as input to a register 280 labeled ISRPN. The output of the register 280 is applied as a second input to the selector switch 278. The output of the selector switch 278 is applied as input to a register 282, the output of which is connected as input to a delay register 284. The output of the delay register 284 is applied in a feedback loop to second input of the selector switch 276. The output of the buffer amplifier 274 is, in addition, applied as an input signal to a register 287, the output of which is connected as a second input to the comparator 262. The output of the register 280 is applied as a second input to the comparator 260. Effectively the two comparators 260 and 262 compare the real page number supplied from externally of the cache memory unit with those obtained from the directory array. Such a comparison will detect a real page number which is not valid for the present cache.

The complementary output of the selector switch 188 is also applied through an inverting amplifier 286 to one input of a switch selector 288 the output of which is connected to the input of a register 290. The output of the backup register 176 is further connected as an input to a selector switch 292 and as a second input to the selector switch 288. The output of the register 190 is connected as a second input to the selector switch 292 and provides a first input to the selector switch 294. The output of the selector 294 is connected as a third input to the selector 288. The output of the register 290 is applied first as an input to a register 296 labeled WRB-WRT. The output of the register 296 is applied as a fourth input to the selector switch 288.

The output of the register 290 is applied to a control input of a RAM 298. The RAM 298 is, in the exemplary embodiment, a 256×8 RAM for storing a written-bit code, more about which will be said hereinafter. The written-bit appears as a four-bit unit, consequently, the RAM 298 is divided into two four-bit sections. The left most section, as illustrated in FIG. 4 is arranged to accommodate the written-bits. The right hand portion of the RAM stores a duplicate of the data written into the left hand portion. This duplication is used, in the exemplary embodiment, as a check for the accuracy of the written-bit. An output from each half of the written-bit RAM 298 is applied as input to corresponding halves of a register 300. An output from each of the two halves of the register 300 is applied as two inputs to a comparator 302. The written-bit code from the left hand portion of the regsiter 30 is also applied as input to a logic network 304 designated NEW WRB. The output of that logic network 304 is applied as input to a register 306 designated WRB. The output of the register 306 is applied simulataneously to both halves of the RAM 298. A written-bit is stored in the RAM 298 in a position corresponding to each block of data stored in the data array 124, 126, 128 and 130. In each level of the data array there is capacity for accommodating 256 blocks of data. There are four levels to the data array. Correspondingly, the written-bits are arranged in an array of 256×4 with each bit designating one block in each corresponding level of the array. In practice, the written-bits are set to designate that the associated cache is the "owner" of the data block. The output of the register 300 is also connected to the ports unit 48 of the CPU to convey the written-bit information to the ports unit.

A complementary output of the selector switch 182 is connected to an input of a delay register 308 labeled RCW-DLY. The output of the register 308 provides a second input connection to the selector switch 294 and a third input connection to the selector switch 292. A fourth input for the selector switch 292 is connected to the output of backup register 178. The output of the selector switch 292 is connected to the input of a register 310 labeled ADD DLY. The output of the register 310 is applied as input to an RCW ADD register 312. The output of the register 312 is applied as input to a RAM 314 designated RCW RAM. The RCW RAM is, in the exemplary embodiment, a 256×6 RAM wherein replacement code words are stored for keeping track of the least recently used data block in the data array of the cache. An output of the RAM 314 is applied as an input signal to a register 316 labeled RPLI the output of which applied to the input of a register 318 labeled MISS LV. The output of the RAM 314 is also applied as input to a register 320 labeled NFT. The NFT register 320 is a part of the system to accommodate non-functional test operations. The output of the register 318 is applied as an input control signal to the directory array including the RAM levels 202, 204, 206 and 208.

The same signal is also applied as one input signal to a selector switch 322. Additional input signals are applied to the selector switch 322 from a block clear logic unit 324 and a hit allocate logic unit 326. The output of the selector switch 322 is applied as a control signal to the RCW RAM 314.

Having thus described the structure of the dual cache and its environment, attention will now be given to the operation of the apparatus.

The I-cache, while identified as the instruction cache, is adapted to contain only unmodified instructions obtained from the main memory. In addition, the I-cache may contain indirect word blocks. The O-cache, on the other hand, is adapted to contain all operands, modified instructions, and modified indirect word blocks.

It is contemplated that the cache structure of the present invention will be used in a high speed computer system wherein more than one CPU may be involved and in which each of the CPUs include a plurality of execution units as discussed in connection with the description of FIG. 2. Inasmuch as more than one execution is involved and that the plurality of execution units may be simultaneously operative, the data and the instructions are presented in a pipeline configuration. To this end, the initial pipeline operation is established through the CUPS unit 24.

In a first instance, a request is made to the I-fetch unit 26 for an instruction. The I-fetch then addresses the I-cache to extract a first instruction. If that instruction is found in the I-cache, the instruction is read out, stored in the instruction stack in the I-fetch unit 26. In serial order the instructions are acquired by the central unit pipeline structure (CUPS 24) where the instruction information is manipulated and used to address the O-cache 22. Assuming that the requested information is stored in the O-cache, depending upon the instruction given, the data will be extracted from the O-cache 22 and transmitted either to the distributor 28 or directly to the CIU 6.

Referring the foregoing procedure to the structure shown on FIGS. 4A & B, a primary request from the CUPS unit 24 is applied to the primary address input of the gate 68 and to the primary address input of the gate 164 and 166. The output from the gate 68 is applied as input to the distribution network including the selectors 96, 98, 100, and 102, as well as the selector 94. The output of the register 68 is also applied to the input of the backup register 70. Similarly, the output signal from the gate 164 is applied as an input to the distribution network represented by the selectors 168, 170, 172, and 174. The primary request signal is also applied through the gate 166 to the backup register 176. The backup registers 70, 72, and 74 comprise a cascaded delay arrangement for holding the primary request address in the succession of registers in the event that there is an interference routine extent which would prevent the direct reading of the primary address into the registers 106, 108, 110 or 112. Similarly, the backup registers 176, 178, and 180 comprise a cascaded delay arrangement, again, to store the primary address signal in the event of an interference routine.

Inasmuch as the cache arrangements comprising the present invention may have more than one operation going on at the same time, a secondary routine, being a routine already in progress is deemed a noninterruptable routine, the primary routine will beconsidered as an interruptable routine because it is at its first stage of operation. Accordingly, in the event of an interfering routine, the primary request will be delayed through the backup registers 70, 72, and 74 in the data array and the backup registers 176, 178, and 180 in the directory array. Under the control of the primary control logic 56 (FIG. 3) the selectors 168, 170, 172 and 174 are actuated to drop the primary address from the gate 164 into each of the registers 194, 196, 198 and 200.

In the exemplary embodiment of the present invention, the primary request includes a 26 bit word address, the first 16 bits of which represent an RPN or Real Page Number. While bits 15–22 represent a block number, bit 15 being overlapped in both numbers. The last three bits represent the word location within the block.

Thus in FIG. 4, the bits 0–15 are applied to the RPN input to the register 242. While bits 15–22 are applied to the primary address input or the directory array. Assuming no interference is present, the switches 168, 170, 172 and 174 gate the block number into the registers 194, 196, 198 and 200. These then simultaneously address all four levels 202, 204, 206 and 208 of the directory array. Each level will, of course, include a block address corresponding to the block address applied thereto. In each of these block addresses there will be a unique 16 bit RPN previously recorded therein as well as a parity-bit and a validity-bit. The RPN at the addressed block in each of four levels will be transmitted through the buffer amplifiers 210, 212, 214, and 216 to the registers 218, 220, 222 and 224. While the block number is being stepped through the directory array to the registers 218–224, the RPN is being stepped through the registers 242, 244, and gated into the register 240. The output of the register 240 is applied to one input of each of the four comparators 246, 248, 250 and 252. The outputs of the registers 218, 220, 222 and 224 are applied, respectively, to the other input of each of the four comparators 246–252. The same actual RPN will not be recorded in more than one level of the directory array. Thus, assuming a "hit", only one of the four comparators will produce a hit output signal.

While the appropriate signals have been stepped through the directory array and the comparators to produce a hit signal, bits 15–24 of the primary request were applied to the input of the gate 68 and were dropped into the registers 106, 108, 110 and 112. The same signals were then stepped into the registers 116, 118, 120 and 122. The address in the registers 116, 118, 120 and 122 is then used to address each of the four levels 124, 126, 128 and 130 of the data array. The information stored at the addressed locations in the four levels of the data array are loaded into the registers 132, 134, 136, and 138. The information stored in the registers 132, 134, 136, and 138 is then applied, respectively, to the four input connections of the two switches 140 and 142. The operation of the cache, so far, is identical irrespective of whether the cache is the I-cache 20 or the O-cache 22. If the cache under consideration is an I-cache and the data extracted from the data array is an instruction, the switch 142 will be selectively activated to select that level output from the data array which corresponds to the level at which the hit was found in the directory. That selected instruction will then be delivered to the instruction fetch register in the fetch unit 26. The selector switch 140 is not used in the I-cache nor is the complementary output from the selector switch 142.

When the primary address is applied through the gate 166 it is loaded into the register 176. The output of the register 176, applied to the input of the switching selector 292 loads that primary address into the register 310. On the next clock cycle that address is loaded into the register 312 identified as an RCW address. Then on the next clock cycle that address is used to address the RCW RAM 314. The RCW RAM 314, as noted, is a 256×6 RAM with each of the 256 rows representing and corresponding, respectively, to the 256 block addresses in the directory for the 256 blocks in each level of the data array. The RCW RAM is updated with a replacement code word which indicates that the addressed block is the most recently addressed block in the cache. The RCW RAM 314 thus keeps track of which blocks in the cache have been most recently used and which have been least recently used.

If the primary address requested had not been present in the cache, the data would have been requested from the main memory unit. When thus retrieved, the requested data would then be loaded into the data array with the address loaded into the directory array. The particular address in the array where the new data will be stored is determined by the RCW RAM 314. The address of the least recently used row in the cache will be loaded into the register 316 then into the miss level decode register 318. That output from the register 318 will indicate the address and level of the block to be occupied by the newly retrieved data.

As was hereinbefore mentioned, in a computer system wherein more than one CPU is involved and has access to the same shared main memory unit, since each of the other CPUs will have its own cache memory system, the block of information from the main memory unit might be accessed by and stored in any one of several cache units. Since the data from the main memory unit may have been modified by any one of the CPUs and stored in its own cache unit, it is important that the current and most recently modified data be stored and available in only one of the several cache units. Therefore, when data is written into a cache unit such as the one illustrated in FIG. 4, the address of that information, applied to the primary address input through the gate 166 and the register 176, in addition to addressing the replacement code word RAM, is also applied, through a selector switch 294 and a selector switch 288, to the register 290. The output of that register 290 addresses WRB RAM 298.

The RAM 298 is, as was previously mentioned, a 256×8 RAM. It is divided into two identical segments of 256×4. One side being a redundant duplicate of the other side. In the RAM, there is stored a WRITTEN bit corresponding to each block address in the cache including the directory array and the data array. When data is written into an allocated block in the associated cache, the corresponding WRITTEN bit is set. The setting of the WRITTEN bit representing each particular block in the associated cache, indicates that the associated cache owns the latest updated version of the particular block of data.

If a read request is made of the cache and the requested block of data is found in the cache, that is a cache hit is accomplished, the written-bit RAM is also interrogated to assure that the data found in the cache is valid data, that is, that it is the latest version of that data. That is determined by ascertaining that the written bit for that block of data is set in the written bit RAM.

With the written bit set, and the valid bit set in directory array, the addressed block of the data array may then transmit the designated data, by way of the selector 142, to the distributor 28 of the associated CPU.

Then, when the CPU has operated upon the data, the modified data is rewritten into the designated address in the data array, with the validity bit set in the directory array and the written bit set in the WRB RAM.

With the cache being operated in a pipeline type of structure, it is possible for more than one operation to be in effect in any one cache at any given time. To this end, secondary signals may be applied to the input of the selector switch 84 in the data array or to the selector switch 188 in the directory array. For the most part, the simultaneous operations may be effected without interference with each other. On some occasions, however, there will be an interference between the two routines.

Inasmuch as the secondary procedures represent operations which have already begun, the secondary operations are given a priority over the primary operations. To this end, the primary address information in the data array is supplied to the backup stack registers represented by the registers 70, 72 and 74. Each of the three registers 70, 72 and 74 represent a one clock time delay. The output of each of the backup registers is connected, respectively, to an input of the selector switch 76 which may then be actuated to gate the appropriate address to the address distribution network. This provides up to a four-clock period delay of the primary request to allow the completion of a secondary operation in progress.

Similarly, in the directory array, the primary address is supplied through the gate 166 to the backup register stack represented by the registers 176, 178 and 180. Again, these registers 176, 178 and 180 provide up to four clock time delay of the primary address signal while a secondary operation in progress is completed.

In the event that the instruction being executed in the cache called for a transfer routine, sometimes referred to as a branch or jump routine, or if the request had been for an indirect addressing program, the corresponding instructions would be extracted from the cache and stored in the instruction stack register of the instruction fetch unit 26. The information stored in the instruction stack of the IFU 26 does not include the real page numbers, they use only the block address and the cache level number of the addressed information. As hereinbefore noted, the instructions stored in the instruction fetch unit are held until such time as they are called for by the operation of the selected routine. Inasmuch as other operations may be carried on simultaneously in the cache, it is possible for the data in an addressed location in the cache to have been withdrawn and/or moved by operation of such other routine in the interim between the time at which an instruction was stored in the instruction stack in the IFU 26 and the time that it is called for operation. If that should occur, when the changed location in the cache is addressed, the information stored therein will be wrong information for the particular routine. In order to avoid the use of such misinformation, whenever such instructions are withdrawn from cache and stored in the instruction stack of the I fetch unit, the RPN of that information is stored in the IRPN stack 256. That stack maintains a one-for-one of the RPNs corresponding to the instructions stored in the instruction stack of the IFU 26. When the individual instruction is extracted from the stack of the IFU 26 to be executed, the RPN of the addressed location in the cache memory corresponding to the address of the instruction, is compared with the RPN for the current instruction sequence. Each time a transfer operation is indicated, the RPN of the transfer sequence is loaded into the register 266 and the register 280, as well as into the register 270 and 282. On the next clock cycle, the contents of the register 270 is loaded into the register 272 and the content of the register 266 included into the register 270. Similarly, the content of the register 282 is loaded into the register 284 and the content of the register 280 is loaded into the register 282. By that time, it will have been determined whether the transfer is a legitimate transfer, that is, whether it is a transfer GO or a transfer NO GO. If it is, in fact, a transfer GO, the content of the register 272 is reloaded into the register 266 and there stored until called upon. Similarly, the content of the register 284 is reloaded into the register 280 and there stored until called upon. If the transfer is a NO GO, the content of the register 272 is dumped and lost. Similarly, if it is a NO GO, the content of the register 284 is dumped. Assuming a GO type transfer, the content of the register 280 represents the RPN of the current transfer sequence. It is that RPN that is compared in the comparator 260 with the corresponding RPN from the IRPN stack 256. If the two RPN numbers are identical, the indication is that the addressed data is proper data. If, on the other hand, the RPN numbers are different, the comparator output will so indicate and report a bad RPN. Under those circumstances, the CUPS will reject the addressed data and do a new fetch from the cache memory. Similarly, when the indicated routine is an indirect addressing program, the RPN is loaded into the register 287 and compared with the RPN from the IRPN stack 256 by operation of the comparator 262. Again, if the two RPNs agree, the output of the comparator so indicates. On the other hand, if the two RPNs do not agree then the output of the comparator 262 indicates a bad RPN number and again, the processor rejects the data.

In the event that the request had been for a cache read routine, and the required information was not in the designated cache, the system would record a cache miss. Upon such a miss, the required information would be extracted from the main memory or obtained from the cache of another control unit, as will be more fully discussed hereinafter. The requested data would then be stored at an allocated position in the memory of the requesting cache. The allocated position would, of course, be determined by the replacement code word for that position stored in the RAM 314. If that position, albeit the least recently used word, contains valid information with the written bit for that word set, in order for that information to avoid being lost, it is swapped out to be restored in the main memory. To that end, the RPN stored in the allocated directory level is loaded into the appropriate one of the registers 226, 228, 230 and 232 to identify the address of data being retransmitted to main memory. The data stored at the corresponding location in the data array will be shifted respectively through the registers 132, 134, 136, 138 and, selectively, through the register 146 to the CIU for transmission to the main memory. The new data and RPN may then be shifted into the location allocated in the cache. If, on the other hand, the data stored at the allocated position is not indicated as being valid information, valid-bit reset, nor does it have the written-bit set, then the new data will be stored into the allocated position replacing the old data without the old data being transmitted back to memory. The reason for that being that, if the written-bit is not set, then the information stored at the allocated position is unmodified information and the correct information is already stored in the main memory. If the information stored at that location is not indicated as being valid, then the correct information is stored in the cache of a different control unit. That being the case, there is no need to transfer the invalid data back to the memory.

As was noted hereinbefore, the cache of the present invention is characterized as being suitable for inclusion in a multiple processor system wherein each of the processors has access to the data in a shared main memory. When data that has been requested or addressed by a different control unit is presently owned by the illustrated cache, that information is requested, or siphoned, from the illustrated cache.

The control of the exchange of data between different control units, in the exemplary embodiment, lies, basically in the CIU in co-operation with the timing and controls illustrated in FIG. 3. The co-operation control features are illustrated in FIG. 5.

As shown in FIG. 5, the multiple processors are represented by the CPU 2 and the CPU 4 of FIG. 1, each of which has been more fully illustrated in FIG. 2. The CIU 6 of FIG. 1 is representative of the interface control.

In the CPU 2, the cache 22 is connected to receive control signals from a level select unit 340 which, in practice, may be a part of the control system illustrated in FIG. 3. In FIG. 2, a part of the CPU is identified as a ports unit 48. Here, the ports unit 48 is shown in dotted line and includes several component parts which are included therein. The ports unit 48 includes, for example, a command's CPU ports command register 342 into which commands or instructions from the CPU control center are entered. The ports command register is connected to a ports swap directory 344, more about which will be said hereinafter. Also included in the ports unit 48 is a duplicate cache directory 346. A search command stack 348 is connected to receive instructions from the CIU 6 and to direct a search of the ports swap directory 344 and the duplicate cache directory 346. The result of the search of the ports swap directory and the duplicate cache directory are fed into and collected by a response generator 350. Thus, the ports command register 342, the port swap directory 344, the duplicate cache directory 346, the search command stack 348 and the response generator 350 are all included within what is identified as the ports unit 48. In the CPU 4 an identical arrangement is provided with the ports unit being identified as 48'. The component parts therein are similarly identified as the CPU ports command register 342', the ports swap directory 344', the duplicate cache directory 346', the search command stack 348', and the response generator 350'.

An output from the duplicate cache directory 346 is connected to the response generator 350. Similarly an output from the ports swap directory 344 is also connected as an input to the response generator. An output from the duplicate cache directory 346 is also connected through the level select unit 340 to the cache 22.

The CPU ports command unit or register 342 has an output connected to a command buffer unit 352 in the CIU 6. An output from the command buffer unit 352 is connected as an input to a block transaction table unit 354. The block transaction table 354 also has an input from the corresponding command buffer 356 connected to receive command signals from the CPU ports command register 342' of the CPU 4. The block transaction table, in response to the command signals stored therein from either or both of the command buffers 352 and 356 issues control signals to a search request generator 358, under the control of a control logic unit 360. The search request generator 358 has output connections to the search command stack 348, the search command stack 348', and to an I/O cache emulator 362. The emulator 362 has characteristics which are similar to that of a cache memory but has a smaller storage capacity and operates in conjunction with the I/O units 10. The I/O cache emulator includes within the structure thereof the equivalent of a swap directory, and, as will be seen hereinafter the equivalent of swap buffer means.

In response to the signals from the search request generator 358, the search command stack 348 and 348' as well as the I/O cache emulator 362 initiate a search to determine whether a requested block of information is located in either of the CPUs or in the cache emulator 362. The result of the search command is returned by the duplicate cache directory 346, the ports swap directory 344 to the response generator 350. Similarly, a result of the signal applied through the search command stack 348 is returned by the port swap directory 344' and the duplicate cache directory 346' to the response generator 350'. The output of the response generators 350 and 350' is applied as input signals to a search request collector 364. The I/O cache emulator 362 also supplies a result signal to the search request collector 364. A request signal is supplied to the search request collector from each of the 3 elements whether the requested information is found or not. The search request collector 364 then outputs a signal to the block transaction table 354. The block transaction table 354 has an output connection to a command complete generator 366. The command complete generator 366, in turn, has output connections to both of the CPU ports command units or registers 342 and 342' to indicate that the search request command had been completed.

It may be seen from FIG. 5 that there is an output connection from the cache 22 to a swap buffer 368. Similarly, there is an output connection from the cache 22' to a similar swap buffer 370. The I/O cache emulator 362 has an output connected to a first distribution line 372. The swap buffer 368 has an output connection to a second distribution line 374 while the swap buffer 370 has an output connection to a third distribution line 376. The first distribution line 372 is connected to a first input of each of four multiplexers 378, 380, 382 and 384, respectively. The second distribution line 374 is connected to a second input of each of the four multiplexers. The third distribution line 376 is similarly connected to a third input terminal of each of the four multiplexers. The first multiplexer 378 has an output connection to the cache 22. The second multiplexer 380 has an output connected to an input of the I/O cache emulator 362. The third multiplexer 382 has an output connection to the main memory 14. The fourth multiplexer has an output connection to the cache 22'. The main memory 14 is illustrated as having an output connection to a fourth input terminal of each of the multiplexers 378, 380 and 384.

Having thus established the structural elements of the apparatus, the operation thereof will now be addressed. It will be recalled that when, for example, the CPU 2 required a block of data, it would search its own cache for the required data. If the data were found there, a cache "hit" was scored and the information from the cache was used in the routine. In the event of a single processor, if a cache "miss" were scored, the main memory was addressed, the required block of data was extracted from the main memory and stored in the cache of the requesting CPU. In the "store into" technique set forth in the exemplary embodiment of the present invention, the data, after being acted upon by the CPU is returned only to the associated cache. The modified data are not returned to the main memory. Under such circumstances, the only place where the latest form of the updated block of data exists is in the particular cache.

In a multiple processor system, this presents a problem in that one processor may require data which are stored in the cache of another processor, necessitating a means for making the required data available to the requesting processor. As was previously noted, this problem has been addressed in an earlier patent—U.S. Pat. No. 3,735,360 Anderson et al. In that patent, however, the data once located in the cache of a different processor must be transferred first to the main memory then back to the cache of the requesting processor. Such a transfer is of necessity quite slow. In accordance with the present invention, however, data requested from the cache of one processor are siphoned or transferred directly through high speed transfer to the cache of the requesting processor.

Exemplary of such a siphon or transfer, the request or command from the control elements of the CPU 2 is entered into the CPU ports command register 342. Which request or command is transfered to a stack position in the command buffer 352 of the interfacing CIU 6. Under the control of the control logic 360, these requests or commands are transferred to the block transaction table 354. It will be recognized that there are, of course, several types of commands issuing from the CPU to the block transaction table 354, depending upon what use is to be made of the requested data.

The block transaction table comprises, among other things, a register stack wherein the commands may be stacked in a predetermined order for execution. The block transaction table 354 also includes means responsive to the control logic 360 to process the commands in a proper order for execution. When the command includes a request for data, the block transaction table issues a control signal to the search request generator 364 identifying the data requested. The search request generator 364 then sends a search command to each of the CPUs and to the I/O cache emulator 362. In the CPU 2 and the CPU 4, the search request signal from the search request generator 358 is received by a search command stack 348 and 348', respectively. The search command stack directs the searching of the duplicate cache directory 346 and the ports swap directory 344 for the identification of the requested block of data. The duplicate cache directory 346 is a duplicate of the directory array 60 of FIG. 3 and will contain the identification of any block of data that is stored in the cache 22. If data is in the process of being transferred from the cache 22 to either the main memory 14 or to the cache of another processor, it is temporarily stored in the swap buffer 368. The ports swap directory 344 maintains a record of the identification and address of all data temporarily stored in the swap buffer 368. Similarly the duplicate cache directory 346' is a duplicate of the directory array associated with the cache 22'. Again, the ports swap directory 344' maintains a record of any data that is temporarily stored in the swap buffer 370. Additionally, the requested block of data may be temporarily stored in the I/O cache emulator 362, having been either called up for action by the I/O unit 10 or as a new entry from the I/O unit 10.

By definition, the latest form of the block of data in modified form can only be present in one of the memory units. If the record of the data is found in the CPU 2's own cache 22, a "hit" is scored and no command signal is sent to the CIU-6. The selected block of data is then used internally in the CPU 2 without further ado.

If, on the other hand, the requested data block were to be found in the cache of the CPU 4, the affirmative response would come from the response generator 350', with all of the others being indicated as a negative response. The search request collector 364 sends a composite signal back to the block transaction table 354, allowing the entry to be cleared from the block transaction table and a command complete signal is transmitted through the command complete generator to the CPU ports allowing the request signal there to be cleared.

When the indication for the presence of the block of data in the cache 22' was found in the duplicate cache directory 346', the "swap" signal is generated by the CPU 4 and, through the level select 340', directs the cache 22' to transfer the requested block of information to the swap buffer 370. The data block placed in the swap buffer 370 is then transferred to the multiplexer 378, under the control of the control logic circuitry 360. From the multiplexer 378, it is transferred to and lodged in the cache 22 of the requesting CPU 2. Such a transfer, of course, would only have taken place if the block of data in the cache 22' had been previously modified and therefore different from the corresponding block of data still stored in the main memory 14. Under these circumstances, the data would still be stored in both the cache 22 and the cache 22'.

When the cache 22 has acquired the desired block of data, the CPU 2 may act upon and further modify the data in the cache 22. When that occurs, the CPU 2 issues a "write notification" signal through the CPU ports command register 342 to the command buffer 352, thence to the block transaction table 354. The block transaction table then transmits the effect of the "write notification" signal to the cache 22', clearing the block address in the cache 22'. As was previously discussed in connection with the operation of the cache units, the clearing is accomplished by resetting the "valid" bit of the associated block of data in the cache. Similarly, as previously discussed, when the CPU 2 has acted upon the selected block of data, the modified data is restored to the cache 22 with its "valid" and "written bit" set. This establishes the ownership of that block of data in the cache 22.

If the requesting CPU had been the CPU 4 and the data had been found in the cache 22 of the CPU 2, the data would have been transferred in a similar manner through the swap buffer 368 and the multiplexer 384 to the cache 22' of the CPU 4.

It will be recalled that, under certain conditions, such as the need to make room for a new entry in the cache 22 or 22', that a block of data will be swapped back to the main memory. Such a swap will be, in each case, controlled by the control circuitry within the CPU. The block of data is moved from the cache 22 into the swap buffer 368. At the same time, the ports swap directory 344 is updated to indicate the identity and location of that particular block of data in the swap buffer 368. Similarly data from the cache 22' would be transferred into the swap buffer 370 and the corresponding indication made in the ports swap directory 344'. The data in the swap buffer 368 and/or the swap buffer 370 will subsequently be transferred through the multiplexer 382 into the appropriate addressed location in the main memory 14.

If during the transition of the data from the cache through the swap buffer and before it has been translated into the main memory 14, a request is made by one or the other of the CPUs for that particular block of data, the requesting CPU issues its command or request through the CPU ports command register 342 or 342' to the command buffer 352 or 356, respectively, to the block transaction table 354. Assuming for the moment that the request came from CPU 2, the request will be processed through the port command unit 342 and the command buffer 352. The block transaction table 354 wiLl again signal the search request generator 358 to issue a search request. As before, the search request is sent out to all units including the search command stack 348 of the CPU 2, the search command stack 348' of the CPU 4 and the I/O cache emulator 362. Again, assuming that the data block in transit is stored in the swap buffer 368, a negative response will be returned from the CPU 4 and from the I/O cache emulator 362. The search command stack will address the request, not only to the duplicate cache directory 346, but to the ports swap directory 344. In this case, the ports swap directory 344 will have the indication therein that the data is, indeed, stored temporarily, in the swap buffer 368 and so responds to the CIU.

Under the control of the control logic and in response to the positive identifying response from the ports swap directory 344 the swap buffer 368 is directed to transfer the requested block of data through the multiplexer 378 back into the cache 22 where it is available for operation by the CPU 2. It will, of course, be recognized if the reason that the data was in the swap buffer 368 was that the cache had already been filled, then a new swap routine must be instituted by the CPU to prepare a place in the cache for the return of the swapped out data. When the swap buffer has transferred the information through the multiplexer 378 into the cache 22, the identifying entry in the ports swap directory 344 will be cleared.

If, on the other hand, it had been the CPU 4 which was requesting the data stored in the swap buffer 368, the procedure would have been substantially the same with the exception that the control logic 360 in conjunction with the block transaction table 354 would instruct the swap buffer 368 to transfer the requested block of data through the multiplexer 384 to the cache 22'.

When a block of data, as previously mentioned, is to be swapped from either cache 22 or 22', the information is translated into the associated swap buffer 368 or 370, respectively, thence through the multiplexer 382 into the main memory 14. When the transfer into the main memory 14 has been completed, the temporary storage indication in the associated ports swap directory is cleared. Once the block of data has been returned to the main memory 14, it is no longer tagged as modified data but is then considered as original data.

The I/O cache emulator 362 has many of the characteristics of a cache memory such as the cache 22 associated with a CPU 2. The I/O cache emulator 362 is, however, associated with the I/O unit 10 and interfaces with the plurality of input/outut units associated with the computer system. If one of the I/O units had required a particular block of data, say, for example, from the main memory 14, that data would have been supplied through the multiplexer 380 to the I/O cache emulator. When the input/output unit had operated upon the data, the data would have been returned briefly to the I/O cache emulator 362 an then returned to the main memory. Similarly, if an I/O unit had required data found in either of the CPU cache units or the swap buffer associated with each of the CPUs, the data would have been transferred through the multiplexer 380 to the I/O cache emulator 362 to make it available to the I/O unit.

If, during the brief interval of the data being lodged in the cache emulator, one of the CPUs, for example, the CPU 2 were to require that block of data, the CPU 2 would issue a request or command through the CPU ports command unit 342. This would again be translated through the command buffer 352 to the block transaction table 354. The block transaction table 354 would trigger the search request generator 358 to send out search request signals to the involved units including the CPU 2, the CPU 4 and the I/O cache emulator 362. Both the CPU 2 and the CPU 4 by way of the response generators 350 and 350', respectively, would return a negative response to the search request collector 364. The I/O cache emulator 362, on the other hand, would return a positive response to the search request collector. The appropriate signal is sent from the search request collector 364 back to the block transaction table 354. In response thereto the requesting CPU port command unit 342 is cleared. Under the control of the control logic 360, responsive to the signal from the I/O cache emulator 362, the requested block of data in the I/O cache emulator is translated into the multiplexer 378 for transmission and loading into the cache 22 of the requesting CPU 2. When the CPU 2 has acted upon the requested data and having modified the same, the data will be returned and stored in the cache 22 with both the "written bit" and the "valid bit" set in the cache 22 indicating ownership of that block of data in the CPU 2. If the CPU-2 had requested the data for the purpose of modifying it, the request or command to the CIU-6 would have been a "read-to-write" signal. This signal initiates an instruction to all of the other storage units whereby, upon completion of the restoration of the modified data to the cache 22, any other storage unit containing a copy of that block of data will have its "written bit" and the "valid bit" reset.

If the block of data had been requested by the CPU 4, then the block of data from the I/O cache emulator would have been transfered through the multiplexer 384 to the cache 22', otherwise the routine would be substantially the same as if the CPU 2 had ordered the data.

In all cases, if the block of data requested is identified as being unmodified, that is still remaining identical to the corresponding block of data in the main memory, the data is never transferred from one cache or the cache emulator to the other but is always drawn directly from the main memory. It is only modified data that is transferred between caches, unmodified data is always drawn directly from the main memory unless, of course, the desired block of data is found in the cache of the requesting CPU.

On rare occasions, there may be a condition of potential conflict in which two of the processors issue requests for the same block of data at substantially the same time. The hierarchy control of the present invention includes a safeguard to obviate an actual conflict.

If, for example, the CPU-2 and the CPU-4 had both requested a "read-to-write" access to the same block of data at substantially the same time, and the block of data was not owned by either CPU, both requests would be sent to the CIU-6. Both requests, however, cannot be loaded into the same slot in the Block Transaction Table 354. One or the other will be loaded into a higher sequential order slot therein. Accordingly, one request will be honored before the other and the second will not be honored until the other has been completed. The completion of the first honored request will result in the block of modified data being owned by the first CPU. All other processors are notified of that ownership.

In response, the second CPU will change its request from a "read-to-write" command to a "siphon and clear" command. That command is reissued to the CIU, requesting the same block of data. Now, however, the modified data will be siphoned from the first CPU, following the process set forth hereinbefore. Upon completion of the transaction in the second CPU, the block of data will be cleared from the cache of the first CPU, its "written bit" and its "valid bit" reset.

It will be appreciated that in a great majority of the cases, each of the CPUs will be operating on the data that is stored within its own cache. Only on relatively rare occasions will there be a request for the transfer or siphon of data from one of the other cache units.

Thus there has been described an improved computer system which features an enhanced throughput characteristic by means of an improved control of the transfer of data between differing processor units of a multiprocessor system.

We claim:

1. A data processing system comprising:
   a plurality of data processing units;
   each such processing unit including a store into cache memory unit for storing data directly available for the use of the associated processing unit;
   a main memory unit;
   a central interface unit coupled to interface between individual ones of said plurality of processor units and between said processor units and said main memory unit;
   each processing unit having access through said central interface unit to extract selected blocks of data from said main memory for storage in the associated cache memory unit, said extracted blocks of data, when modified by said processing units being returned for storage to the cache memory unit of the individual modifying processing unit wherein the latest modification of any modified block of data resides only in the cache unit of the modifying processing unit; and
   said central interface unit including means for producing control signals, a swap buffer means for storing blocks of data, there being a swap buffer means for each processor unit, and multiplexer means, said multiplexer means responsive to control signals produced by the central interface unit's means for producing control signals, for transmitting a block of data stored in any one swap buffer means directly to the cache memory unit of a data processing unit or to the main memory unit; said central interface unit responsive to a request signal from a requesting data processing unit requesting a given block of modified data stored in the cache unit of another data processing unit, hereinafter the possessor data processing unit, for causing the possessor data processing unit to transfer the given block of modified data from its cache unit to the swap buffer of the central interface unit associated with the possessor data processing unit, said central interface unit responsive to the storage of said given block of modified data in the swap buffer associated with the possessor data processing unit for causing the central interface unit's means for producing control signals to produce control signals causing the multiplexer means to transmit said given block of modified data stored in the swap buffer associated with the possessor data processing unit directly to the cache unit of the requesting data processing unit.

2. A data processing system comprising:
   a plurality of data processing units (DPU) each DPU including a store into cache for storing blocks of data for use by its DPU;
   a random access main memory unit (RAM) for storing blocks of data;
   a central interface unit (CIU) means operatively connected to each DPU and to the RAM, said CIU means including control means for producing control signals, a swap buffer means for storing blocks of data, there being a swap buffer means for each DPU, and multiplexer means responsive to control signals produced by the CIU's control means for transmitting a block of data stored in any one swap buffer means to the cache of a DPU or to the main memory unit;
   said CIU means responsive to a request by a requesting DPU for a given block of data for causing each DPU to determine if the only valid copy of given block of data is stored in its cache;
   the DPU in whose cache the only valid copy of the given block of data is stored causing said valid copy of the given block of data to be transferred from the transferring DPU's cache to the swap buffer of the CIU associated with the transferring DPU for storage therein;
   said CIU responsive to the storage of the said valid given block of data in the swap buffer associated with the transferring DPU causing the CIU's means for producing control signals to produce control signals causing the multiplexer means to transmit the valid copy of the given block of data stored in the swap buffer associated with the transferring DPU directly to the cache of the requesting DPU.

3. A data processing system comprising:
   a plurality of data processing units;
   each data processing unit including a store into cache unit for storing blocks of data for use by its data processing unit, each cache unit including a data array for storing blocks of data and a directory array for storing identification data identifying the blocks of data stored in the data array and the status of said blocks of data, the status of a block of data being determined by a valid bit and a write bit;
   each data processing unit further including a ports unit means, each ports unit means including a ports command register, a duplicate cache directory, which is a duplicate of the cache directory of the cache unit of the data processor unit, said data processor unit including means for causing the identification data stored in its cache directory to be stored substantially concurrently in the duplicate cache directory of the data processor unit's ports unit means;
   a random access main memory unit for storing blocks of data;

a central interface unit (CIU) operatively connected to each of the data processing units and to the main memory unit, said CIU including control means for producing control signals, a swap buffer for storing blocks of data words, there being a swap buffer associated with each DPU, and multiplexer means, said multiplexer means responsive to control signals produced by the CIU's control means for transmitting a block of data stored in any one swap buffer to the cache unit of a DPU or to the main memory unit, said CIU receiving command signals from the command registers of the ports units of the DPU requesting a given block of data not stored in the requesting DPU's cache unit, said CIU including means responsive to the receipt of such command signals from a requesting DPU, for producing a search request signal and transmitting the search request signal to the ports units of each DPU, the ports unit including means respnsive to the receipt of a search request signal from the CIU for causing each ports unit to search its duplicate directory to determine if the requested block of data is stored in the data array of its DPU's cache unit and its status, each ports unit including response generator means for producing an affirmative response if the requested block of data is stored in its data array and the write and valid status bits of the requested data are set;

said CIU, responsive to an affirmative response from a ports unit of a DPU, producing a command complete signal which is transmitted to the ports unit of the DPUs;

the DPU whose ports unit produces the affirmative response signal, producing a swap signal causing its cache unit to transmit the desired block of data from its cache unit to its associated swap buffer;

said CIU responsive to the storage of the desired block of data in the DPU's swap buffer producing control signals causing the multiplexer means to transmit the desired block of data from the swap buffer in which it is stored directly to the cache unit of the DPU requesting the desired block of data.

* * * * *